(12) United States Patent (10) Patent No.: US 8,282,161 B1
Jacobson (45) Date of Patent: Oct. 9, 2012

(54) CAR SEAT CATCH ALL AND STORAGE DEVICE

(76) Inventor: Jeff A Jacobson, Corona Del Mar, CA (US)

( * ) Notice: Subject to any disclaimer, the term of this patent is extended or adjusted under 35 U.S.C. 154(b) by 113 days.

(21) Appl. No.: 12/949,472

(22) Filed: Nov. 18, 2010

(51) Int. Cl.
*A47C 7/62* (2006.01)
*B60R 7/00* (2006.01)

(52) U.S. Cl. ...................................... 297/188.2; 224/275

(58) Field of Classification Search ................. 296/37.8, 296/1.07; 224/275, 544; 297/463.1, 463.2, 297/188.01, 188.2, 182; 220/657
See application file for complete search history.

(56) References Cited

U.S. PATENT DOCUMENTS

| 2,526,576 | A | * | 10/1950 | Nelson | 297/182 |
|---|---|---|---|---|---|
| 6,022,072 | A | | 2/2000 | Moyer | |
| 6,766,927 | B1 | | 7/2004 | Cart | |
| D533,325 | S | * | 12/2006 | Bird | D34/1 |
| 7,527,314 | B2 | | 5/2009 | Dohan | |
| 2007/0241581 | A1 | | 10/2007 | Martin | |
| 2008/0272166 | A1 | * | 11/2008 | Frank et al. | 224/544 |
| 2009/0127882 | A1 | | 5/2009 | Thibodeau | |
| 2009/0134688 | A1 | | 5/2009 | Waltman et al. | |
| 2009/0224563 | A1 | | 9/2009 | Gregory | |

* cited by examiner

*Primary Examiner* — Milton Nelson, Jr.
(74) *Attorney, Agent, or Firm* — Greenberg Traurig, LLP

(57) ABSTRACT

A car seat catch all and storage device of a resilient deformable material adapted to fill the gaps between the front seats of a vehicle and the center console. The device has an interior for trapping and retaining items and debris therein and conforms to the width of the gap. The device is reversible so that it can conform and fill each gap in the vehicle.

5 Claims, 4 Drawing Sheets

CAR SEAT CATCH ALL AND STORAGE DEVICE

RELATED APPLICATION

Not Applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISK

Not Applicable.

BACKGROUND

1. Field

The invention relates to a device for a vehicle mounted in the space between the vehicle console and a seat for catching debris or like or storing articles therein.

2. General Background

DESCRIPTION OF RELATED ART INCLUDING INFORMATION DISCLOSED UNDER 37 CFR 1.97 AND 1.98

Generally speaking, most vehicles have a console in the front or passenger section of the vehicle with a driver's seat on one side of the console and a passenger's seat on the other side of the console.

There is generally a space between the front console and each of the passenger and driver's seats. Anything that falls in this space ends up on the floor beneath the seat and is difficult to retrieve. Also, on some vehicles, there is no place to store items such as cell phones, pens, tissues, etc.

There is a need for a device that is located in the space between a console and a car seat that not only deflects items that fall into this space but easily traps and collects such items. Such a device should also provide storage for small items, work in all vehicles and be easy to remove and clean.

BRIEF SUMMARY OF THE INVENTION

It is an object of this invention to provide a device that fills the spaces between the console of a vehicle and the passenger and driver's seat on opposite sides of the console.

It is a further object of the invention to provide such a device that traps and collects items that normally would fall into the spaces between the console and the seats or provides a storage area for incidental items.

It is still another object of this invention to provide such a device which is quickly and easily installed in all vehicles, is inexpensive to manufacture and easily removable for cleaning and/or emptying.

These and other objects are preferably accomplished by providing a one-piece insert, generally V-shaped in cross-section, of a resilient material that is closed off at the ends, accommodates itself to the spaces between a vehicle console and the front seats and traps or holds items therein.

DESCRIPTION OF THE PREFERRED EMBODIMENT

Figure 1:
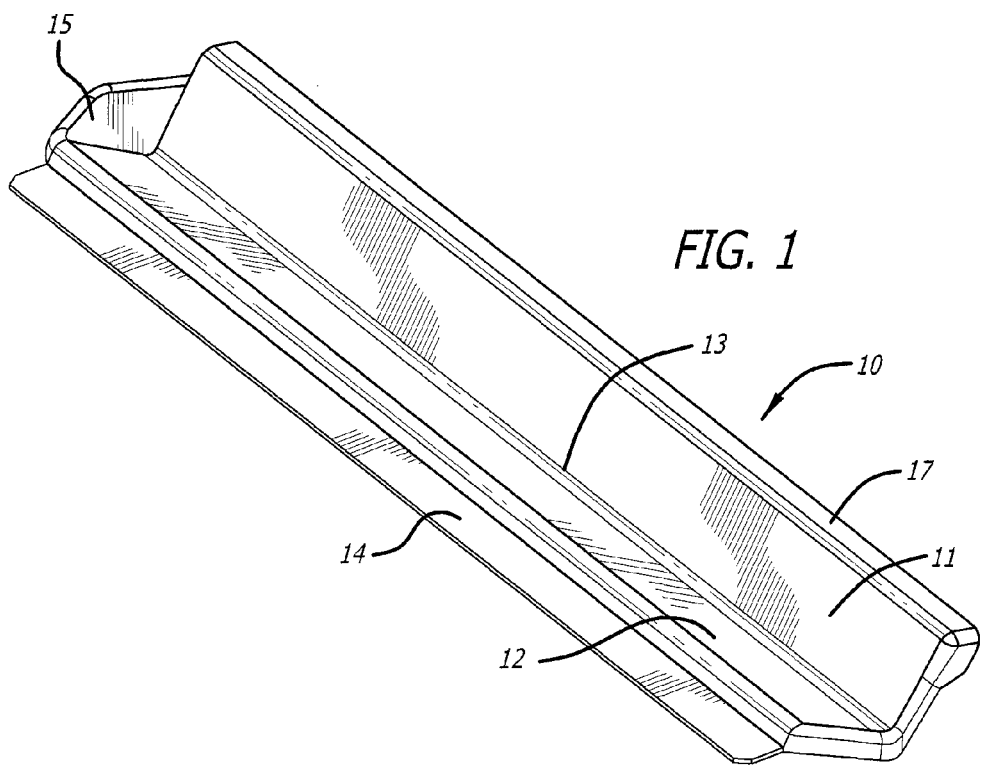
FIG. 1 is a perspective view of the car seat catch all and storage device in accordance with the teachings of the invention.

Referring now to FIG. 1 of the drawing, a car seat catch all and storage device 10 is shown having a generally Vee shaped configuration in cross-section with a first vertical elongated side wall 11, a second elongated side wall 12 connected to side wall 11 along center line 13, extending at an angle of about 35° to 45° to side wall 11, and terminating in an outwardly extending, elongated generally horizontally extending lip 14. Side wall 11 terminates along its upper elongated end in a flange 17.

Figure 2:
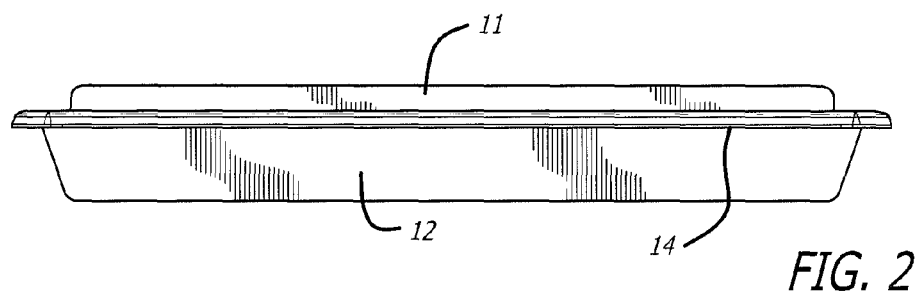
FIG. 2 is an elevational side view of the device of FIG. 1.
Figure 3:
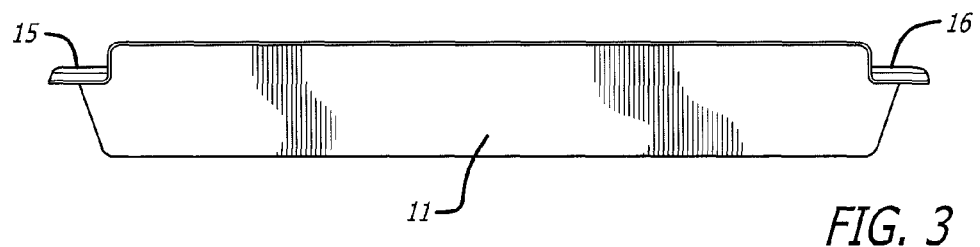
FIG. 3 is an elevational side view of the side opposite that of FIG. 2.
Figure 4:
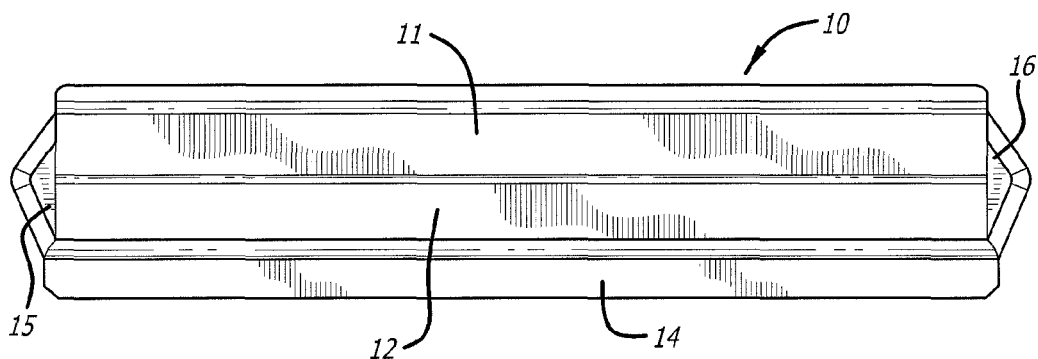
FIG. 4 is a top plan view of the device of FIGS. 1 to 3.

Device 10 is closed off at each end by end walls 15, 16 (see also FIG. 4). As such, as seen in FIGS. 2 and 3, wall 11 is higher than wall 12 (see also FIG. 4).

Figure 5:
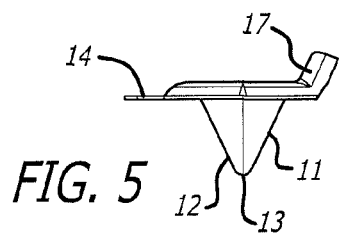
FIG. 5 is an end view of the device of FIG. 1.

The V-shaped cross-section of device 10 is clearly shown in FIG. 5.

Figure 6:
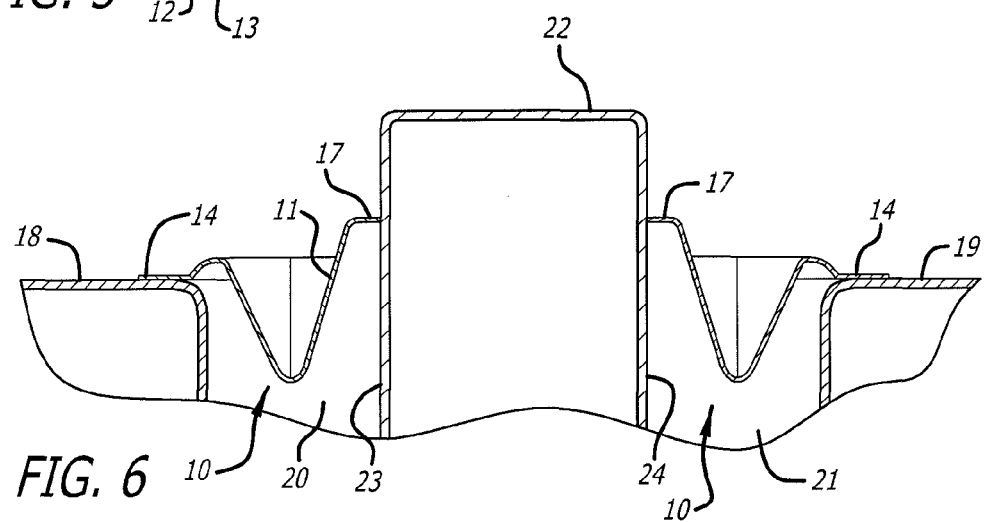
FIG. 6 is a cross-sectional view of a pair of devices, as in FIG. 1, shown installed between the center console and the front passenger and driver's seats on each side of the console, the upper surface of the console being higher than the upper surfaces of the seats.

FIG. 6 is a cross-sectional view of the front interior of a vehicle showing a center console 22. A passenger seat 18 is disposed on one side of console 22 and a driver's seat 19 is disposed on the other side of console 22. A space 20 is normally provided between seat 18 and console 22 and a space 21 is normally provided between seat 19 and console 22.

As previously discussed, these spaces 20, 21 provide areas into which pens, keys, waste material, etc. may fall into and be difficult to retrieve. Further, in many vehicles, there is no place to store one's pen, cell phone, tissues, etc.

As particularly contemplated in the invention, a pair of devices 10 are inserted into the spaces 20, 21 between seats 18, 19 and console 22. In the illustration in FIG. 6, the upper end of the console 22 is higher than the upper surfaces of seats 18, 19. Device 10 fills the space 20, and being of a resilient material, spreads out with lip 14 resting on the upper surface of seat 18. The flange 17 on wall 11 abuts against the side 23 of console 22.

Device 10, filling the space 21, is reversed in orientation from device 10 filling space 20. Thus, lip 14 rests on top of seat 19 and flange 17 abuts against the side 24 of console 22.

Figure 7:
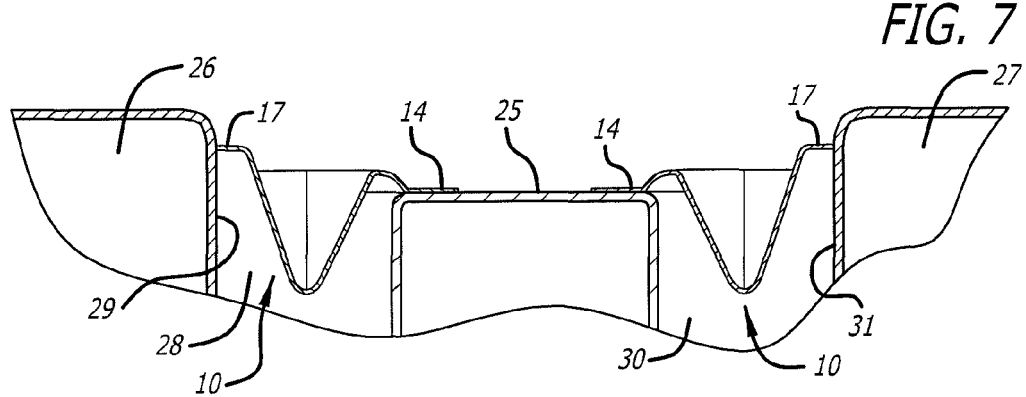
FIG. 7 is a cross-sectional view similar to FIG. 6 where the upper surface of the console is lower than the upper surfaces of the seats.

The versatility of device 10 can be appreciated in the set-up of FIG. 7. Here, the upper surface of console 25 is lower than the upper surfaces of seats 26, 27. Device 10, disposed the space 28 between seat 26 and console 25, is oriented as device 10 in FIG. 6 to the right of console 22. That is, lip 14 (FIG. 7) rests on the top of console 25 and flange 17 abuts against the side 29 of seat 26. The device 10, disposed in space 30, has its lip 14 resting on the top of console 25 and flange 17 abuts against the side 31 of seat 27.

Figure 8:
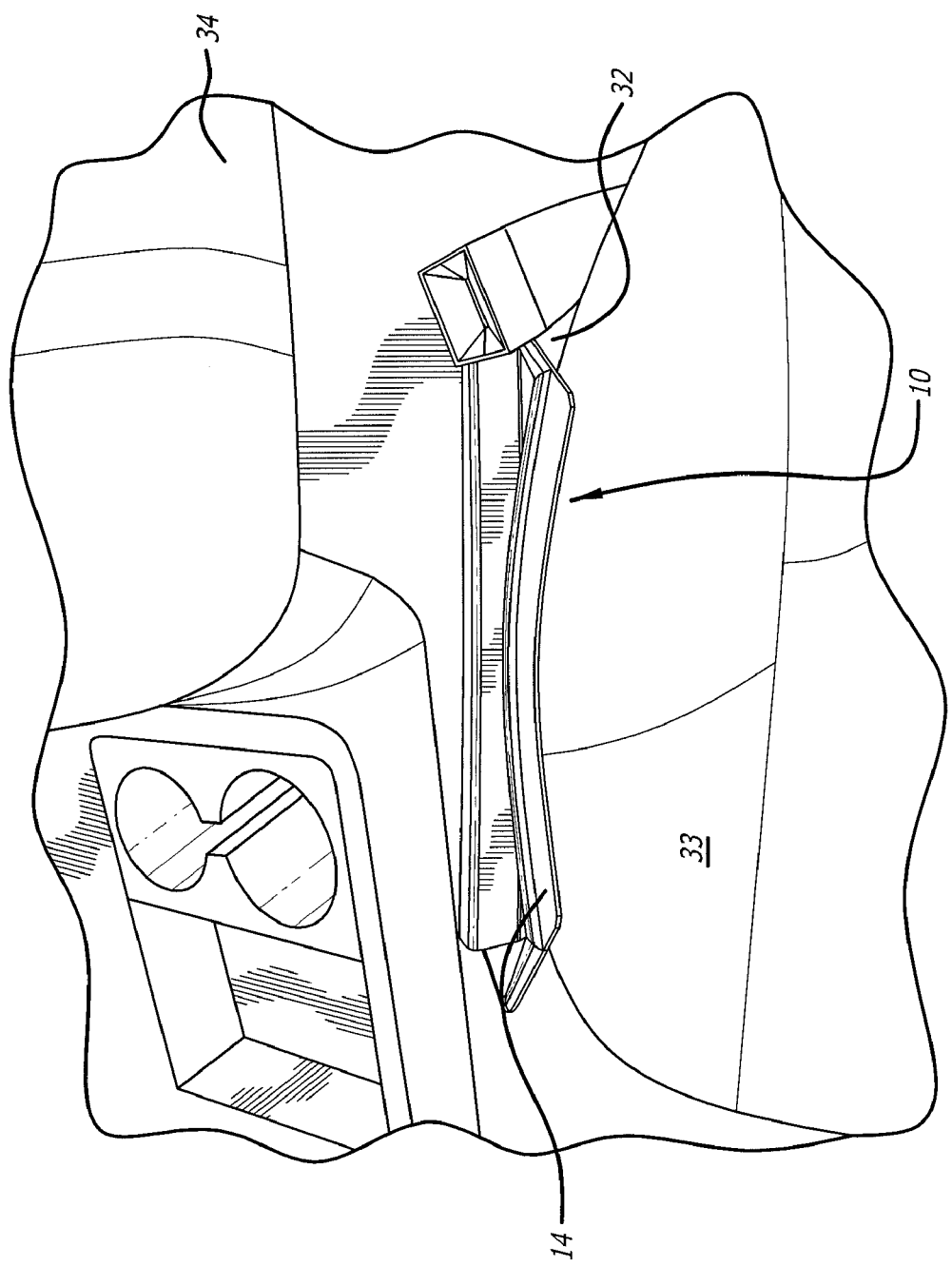
FIG. 8 is a plan view of a portion of the front of a vehicle showing a device in accordance with the teachings of the invention installed between the front driver's seat of a vehicle and the center console.

FIG. 8 illustrates another unique feature of the invention. Here, device 10 is disposed in space 32 between the driver's seat 33 and console 34. The device 10, again being of a resilient material, curves to follow the contour of seat 33. That is, lip 14 overlies seat 33 and curves along the upper surface thereof.

Figure 9:
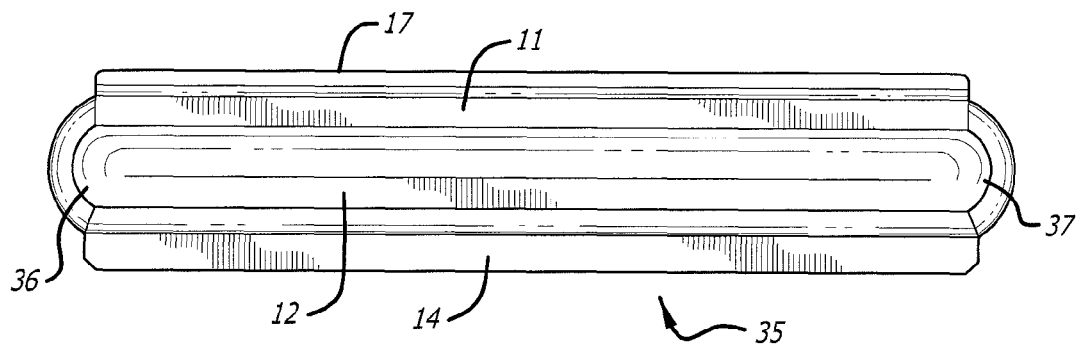
FIG. 9 is a top plan view of a modification of the device of FIGS. 1 to 8.
Figure 10:
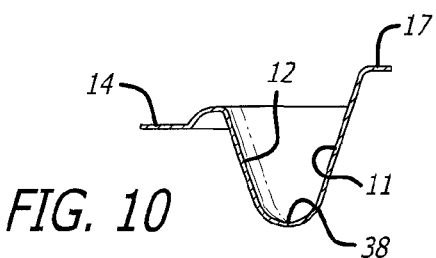
FIG. 10 is a cross-sectional view of the device of FIG. 1 illustrating a modification thereof.
Figure 11:
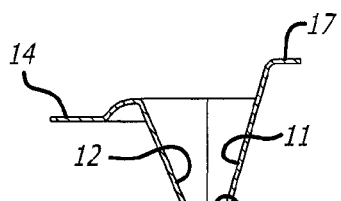
FIG. 11 is a cross-sectional view of the device of FIG. 1 illustrating a further modification thereof.

A modified device 35 is shown in FIG. 9. Here, end walls 36, 37 are curved and, as seen in FIG. 10, the intersection of walls 11, 12 is curved along bottom 38. Also, as seen in FIG. 11, instead of being curved at bottom, the intersection of walls 11, 12 may be flat as indicated at bottom wall 39. Like numerals in FIGS. 9-11 refer to like parts of the embodiment of FIG. 1.

Devices 10 and 35 may be of one piece of a molded resilient plastic. The configurations of devices 10 and 35 have built in hanging mechanisms and end walls which retain items falling into devices 10 and 35. Flange 17 provides structural support.

In summary, device 10 is preferably made of a resilient material, such as a thermoplastic rubber material, so that it conforms to the spacings 19, 20. Further, a device 10 may be inserted into space 20 and another device 10 may be reversed and inserted into space 21.

As seen in FIG. 6, the device 10 in space 20 has its vertical wall 11 abutting against the side wall 22 of console 17 with wall 12 extending at an angle therefrom with lip 14 overlying the top of seat 18. Similarly, the device 10 disposed in space 22 has its vertical wall 11 abutting against the side wall 24 of console 17 with wall 12 extending at an angle therefrom and terminating in lip 14 overlying the top of seat 19.

The end walls 15, 16 retain debris or articles inside of device 10. The device 10 can be quickly and easily lifted out, emptied, or even placed in a dishwasher for cleaning. Due to the resiliency of device 10, it follows the contour of the car seat, such as the seat 33 in FIG. 8, extending between seat 33 and console 34 in front of the seat belt connector. A conventional cup holder and tray compartment is shown in console 34.

Thus, device 10 eliminates the need to dig between the seats of a car to retrieve valuables or the like. Device 10 both traps and stores articles or debris and fits all spaces or gaps between car consoles and car seats. It is of one piece and its V-shape and resilient material provides for material expansion and contraction to fit all sizes of gaps in a vehicle.

One side of the V-shaped device 10 has a flap or lip 14 to hang onto whatever is lower, the seat or console, and the other side 11 of the Vee is higher and straighter so that, when the V tilts from hanging onto the lower surface, the taller straight side 11 is tilted to the higher side (seat or console) to prevent device 10 from falling into the space between the seat and console. The configuration of walls 11, 12 allows device 10 to fit into all irregular heights of seats and console.

It can be seen that there is described a device for not only deflecting items or objects that fall into the spaces between a vehicle console and the front passenger and driver's seat, but traps or captures objects therein. The device can be easily accommodated to these spaces in all vehicles and be easily removed for cleaning. It can be used in vehicles where the passenger and driver's seats are the same height as the console, or the console is higher or lower than the seat's height.

The device can be installed in either longitudinal direction of these spaces, front to rear, or rear to front, be easily removable for cleaning and of an elastomeric material, such as a thermoplastic rubber, to follow the contours of the seats. It can be of a one piece construction, dishwasher safe, and less expensive to manufacture than known prior art devices and molded or otherwise formed from one piece of material. Thus, being of a resilient material, the hanging mechanism is built in to accommodate spacings of differing widths. It collapses easily and in the same place each time to accommodate the differing widths. The built-in end walls serve to allow items and debris to be collected inside of the device without losing such items or debris out of the ends.

The device is designed to hang onto the lower of either the console or the seat, the 90 degree flap or lip protruding from one side of the V shaped device. This causes the device to tilt in the opposite direction, where that side of the V is taller and has a straight wall without a 90 degree flap. Thus, this side tilts against the wall of the higher of the seat or console.

The strategic placement of the folds of the device allows it to be molded in a malleable material, such as thermoplastic rubber or equivalent, that uses the unique design to allow it to adapt its shape to that of the gap between the car seats and the vehicle console, wide in some areas adjacent the seat belt and narrower toward the front of the seats. Also, most vehicle seats are not straight or linearly extending and have a side curvature adjacent the spacing between the seat and console and the unique design herein curves and still maintains the integrity of the inner collecting trough.

If desired, patches of hook and loop material may be provided for adhering the same to either the upper surface of a seat or console and the undersurface of lips 14 for securing the device 10 in position.

Although a particular embodiment of the invention is disclosed, variations thereof may occur to an artisan, and the scope of the invention should only be considered in conjunction with the scope of the appended claims.

The invention claimed is:

1. A debris and item storage device for use in a vehicle having a front passenger seat and a front driver's seat, a center console separating the passenger seat from the driver's seat, said center console having a gap between at least the driver's seat and said console, said device for filling a gap of a vehicle disposed between either a passenger seat or driver's seat of a vehicle and a center console of a vehicle and having a shape and width defined by said gap, said device having an interior and being of a resilient deformable material and thereby allowing the device to spring into place conforming to said gap and adapted to retain therein items falling into the interior of said device, said device having a first side wall, a second side wall extending at an angle to said first side wall, said first and second side walls each having a top and bottom and being interconnected along their bottoms forming a generally V-shaped cross-section;

said first side wall extending from a first end to a second end and terminating at its top in an outwardly extending elongated flange;

said second side wall extending from a first end to a second end terminating at its top in an elongated lip, said lip being lesser in width than said flange and both said lip and said flange lying in horizontal planes of differing heights with respect to the overall heights of said side walls; and said first end of said first side wall being connected to the first end of said second side wall forming a first end wall, the second end of said second side wall being connected to the second end of said first side wall forming a second end wall, and the interior of said device between said first and second side walls and said first and second end walls providing an enclosed area for holding items deposited therein.

2. The device of claim 1 wherein said device is for use in a vehicle wherein a pair of gaps are formed, a first gap being formed between a center console of the vehicle and a driver's seat of the vehicle, and a second gap being formed between the center console of the vehicle and a passenger seat of the vehicle, each of said driver's seat and said passenger seat having an upper wall, said device being reversible so that it adapts to the spacing of either of said gaps, said center console having an upper surface and interconnected side walls, said flange adapted for overlying either the upper wall of said passenger seat when the upper surface of said center console is higher than the upper wall of said passenger seat and said lip abuts against one of the side walls of said center console, or said flange is adapted to overly the upper surface of said center console when the upper surface of said center console is lower than the upper wall of said passenger seat, with said lip abutting against said driver's seat.

3. The device of claim 2 wherein said first and second side walls of said device meet along their bottoms in a generally straight line.

4. The device of claim 2 wherein the second side wall of said device extends upwardly above said first side wall of said device.

5. The device of claim 2 wherein said first and second end walls extend away from said first and second ends respectively of said first and second side walls of said device forming a pointed terminal end.

* * * * *